US012367811B2

(12) United States Patent
Yun

(10) Patent No.: US 12,367,811 B2
(45) Date of Patent: Jul. 22, 2025

(54) DISPLAY DEVICE AND METHOD FOR DRIVING THE SAME

(71) Applicant: LG DISPLAY CO., LTD., Seoul (KR)

(72) Inventor: SeongHo Yun, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/379,025

(22) Filed: Oct. 11, 2023

(65) Prior Publication Data

US 2024/0257714 A1 Aug. 1, 2024

(30) Foreign Application Priority Data

Jan. 31, 2023 (KR) ........................ 10-2023-0012895

(51) Int. Cl.
*G09G 3/32* (2016.01)

(52) U.S. Cl.
CPC ......... *G09G 3/32* (2013.01); *G09G 2300/043* (2013.01); *G09G 2310/0275* (2013.01); *G09G 2310/08* (2013.01); *G09G 2320/0233* (2013.01); *G09G 2330/021* (2013.01)

(58) Field of Classification Search
CPC ..... G09G 2300/043; G09G 2310/0275; G09G 2310/08; G09G 2320/0233; G09G 2330/021; G09G 3/32; G09G 3/3233
See application file for complete search history.

(56) References Cited

U.S. PATENT DOCUMENTS

2009/0115765 A1* 5/2009 Toyomura ............ G09G 3/3233 345/211
2014/0184665 A1* 7/2014 Yoon .................... G09G 3/3241 345/82
2014/0306945 A1* 10/2014 Kishi ....................... G09G 3/30 345/76
2017/0162112 A1* 6/2017 Ha ....................... G09G 3/3266
2019/0114970 A1* 4/2019 Moradi .................. H10K 59/00
2020/0043420 A1* 2/2020 Kang .................. G09G 3/3291
2020/0380906 A1* 12/2020 Kim ..................... G09G 3/3258
2021/0020083 A1* 1/2021 Kim ....................... G09G 3/006
2021/0027729 A1* 1/2021 Shan .................... G09G 3/3677
(Continued)

FOREIGN PATENT DOCUMENTS

KR 20140115454 A * 10/2014
KR 10-2021-0009899 A 1/2021

*Primary Examiner* — Kenneth Bukowski
(74) *Attorney, Agent, or Firm* — Birch, Stewart, Kolasch & Birch, LLP

(57) ABSTRACT

A display device can include a display panel having subpixels each including a driving transistor; a data driver to drive data lines and reference lines connected to the subpixels; a timing controller to control the data driver; and a power management circuit to supply a reference voltage to the reference lines. Also, the data driver receives the reference voltage of a first specific level for a first row line of the subpixels from the power management circuit and supplies the reference voltage of the first specific level to the first row line as an initialization voltage during a threshold voltage sensing mode, and receives the reference voltage of a second specific level for a second row line of the subpixels from the power management circuit and supplies the reference voltage of the second specific level to the second row line as the initialization voltage during the threshold voltage sensing mode.

26 Claims, 7 Drawing Sheets

(56) References Cited

U.S. PATENT DOCUMENTS

| | | | | |
|---|---|---|---|---|
| 2021/0118352 | A1* | 4/2021 | Baek | G09G 3/2007 |
| 2022/0068225 | A1* | 3/2022 | Min | H10K 59/1216 |
| 2022/0375413 | A1* | 11/2022 | Pyun | G09G 3/3275 |
| 2023/0317006 | A1* | 10/2023 | Kim | G09G 3/3233<br>345/690 |

* cited by examiner

DISPLAY DEVICE AND METHOD FOR DRIVING THE SAME

CROSS-REFERENCE TO RELATED APPLICATION

This application claims priority to Korean Patent Application No. 10-2023-0012895 filed on Jan. 31, 2023, in the Republic of Korea, the entirety of which is hereby expressly incorporated by reference into the present application.

BACKGROUND

Technical Field

The present disclosure relates to a display device capable of shortening a time for sensing a threshold voltage of a driving transistor and a method for driving the same.

Discussion of the Related Art

An electroluminescent display device has a high luminance and a low driving voltage by using a self-luminous element for emitting an emission layer through recombination of electrons and holes. In addition, it is advantageous in that it enables a thin profile and more freedom in its design shape.

Each of a plurality of subpixels disposed in the electroluminescent display device can include a light emitting element and a pixel circuit including a driving transistor for driving the light emitting element.

The electroluminescent display device can use an external compensation technique for sensing and compensating for a threshold voltage (hereinafter, referred to as 'Vth') of a driving transistor, to thereby prevent non-uniformity of luminance due to a threshold voltage deviation between the driving transistors.

The electroluminescent display device drives the driving transistor up to a saturation state to sense the threshold voltage Vth, in which a certain amount of a time is needed for sensing the threshold voltage Vth. As a resolution increases, the time for sensing the threshold voltages Vth in the entire display panel also increases and can end up requiring a considerable amount of time. Also, electroluminescent display devices use the same reference voltage applied to all the reference lines of the display panel for sensing threshold voltages Vth in the display panel. However, different rows of pixels can have different characteristics and different needs, and using the same reference voltage for all the rows of pixels can lead to inefficiencies, such as increased power consumption and longer sensing times. These problems can be further exasperated and can become particularly pronounced when the display device is made larger and has a higher resolution.

Thus, there a need exists in the related art for being able to sense threshold voltages Vth for an entire display panel in a shorter amount of time, even when the display panel is very large and has a high resolution, while also being able to reduce power consumption.

The disclosure of the above-described background art is owned by the inventor of the present disclosure to devise the present disclosure or is technical information acquired by a process of devising the present disclosure, but can not be regarded as the known art disclosed to the general public before the present disclosure is disclosed.

SUMMARY OF THE DISCLOSURE

The present disclosure is directed to a display device that substantially obviate one or more of the problems due to limitations and disadvantages of the related art.

An aspect of one or more embodiments of the present disclosure is to provide a display device capable of shortening a time it takes for sensing a threshold voltage of a driving transistor and reducing power consumption, and a method for driving the same.

Additional features and aspects of the present disclosure will be set forth in the description that follows and in part will become apparent from the description or can be learned by practice of the inventive concepts provided herein. Other features and aspects of the inventive concepts can be realized and attained by the structure particularly pointed out in, or derivable from, the written description, claims hereof, and the appended drawings.

In accordance with an aspect of the present disclosure, a display device can include a display panel having subpixels, each of the subpixels including a driving transistor; a data driver configured to drive data lines and reference lines connected to the subpixels in the display panel; a timing controller configured to control the data driver; and a power management circuit configured to supply a reference voltage to the reference lines of the display panel through the data driver. The data driver can be configured to receive the reference voltage having of a first specific level for a first row line of the subpixels from the power management circuit and supply the reference voltage of the first specific level to the first row line as an initialization voltage during a threshold voltage sensing mode, and receive the reference voltage of a second specific level for a second row line of the subpixels from the power management circuit and supply the reference voltage of the second specific level to the second row line as the initialization voltage during the threshold voltage sensing mode, and wherein the reference voltage of the first specific level is different than the reference voltage of the second specific level.

In accordance with another aspect of the present disclosure, a method for driving a display device can include supplying a reference voltage of a first specific level to a first row line of subpixels as an initialization voltage during a threshold voltage sensing mode; and supplying the reference voltage of a second specific level to a second row line of the subpixels as the initialization voltage during the threshold voltage sensing mode, wherein the reference voltage of the first specific level is different than the reference voltage of the second specific level.

It is to be understood that both the foregoing general description and the following detailed description of the present disclosure are by way of example and are intended to provide further explanation of the disclosures as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principles of the disclosure. In the drawings.

DETAILED DESCRIPTION OF THE EMBODIMENTS

Figure 1:
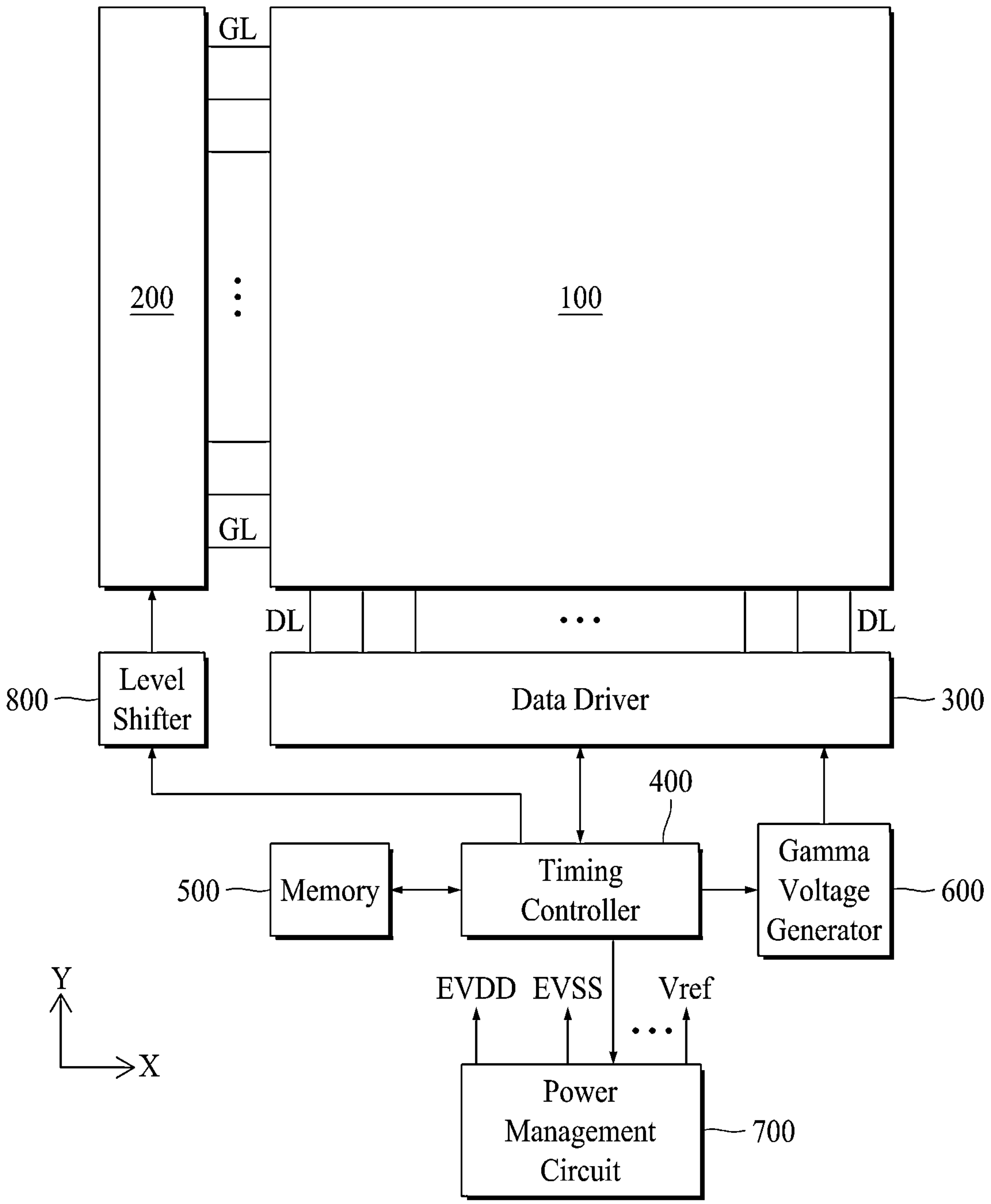
FIG. 1 is a block diagram schematically illustrating a configuration of a display device according to one embodiment of the present disclosure.

Advantages and features of the present disclosure, and implementation methods thereof will be clarified through following aspects described with reference to the accompanying drawings. The present disclosure can, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a situation where “comprise,” “have,” and “include” described in the present specification are used, another part can be added unless “only” is used. The terms of a singular form can include plural forms unless referred to the contrary.

In construing an element, the element is construed as including an error range although there is no explicit description.

In describing a position relationship, for example, when a position relation between two parts is described as “on,” “over,” “under,” and “next,” one or more other parts can be disposed between the two parts unless a more limiting term, such as “just” or “direct(ly)” is used.

In describing a time relationship, for example, when the temporal order is described as, for example, “after,” “subsequent,” “next,” and “before,” a situation which is not continuous can be included unless a more limiting term, such as “just,” “immediate(ly),” or “direct(ly)” is used.

It will be understood that, although the terms “first,” “second,” etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms “first,” “second,” “A,” “B,” “(a),” “(b),” etc., can be used. These terms are intended to identify the corresponding elements from the other elements, and basis, order, or number of the corresponding elements should not be limited by these terms. As for the expression that an element or a layer is “connected,” “coupled,” or “adhered” to another element or layer, the element or layer can not only be directly connected or adhered to another element or layer, but also be indirectly connected or adhered to another element or layer with one or more intervening elements or layers “disposed” between the elements or layers, unless otherwise specified.

The term “at least one” should be understood as including any and all combinations of one or more among the associated listed elements. For example, the meaning of “at least one or more of a first element, a second element, and a third element” denotes the combination of all elements proposed from two or more of the first element, the second element, and the third element as well as the first element, the second element, or the third element.

Features of various aspects of the present disclosure can be partially or overall coupled to or combined with each other, and can be variously inter-operated with each other and driven technically as those skilled in the art can sufficiently understand. The aspects of the present disclosure can be carried out independently from each other, or can be carried out together in co-dependent relationship.

Hereinafter, the aspect of the present disclosure will be described with reference to the accompanying drawings. Since a scale of each of elements shown in the accompanying drawings is different from an actual scale for convenience of description, the present disclosure is not limited to the shown scale. Further, all the components of each display device according to all embodiments of the present disclosure are operatively coupled and configured.

Figure 2:
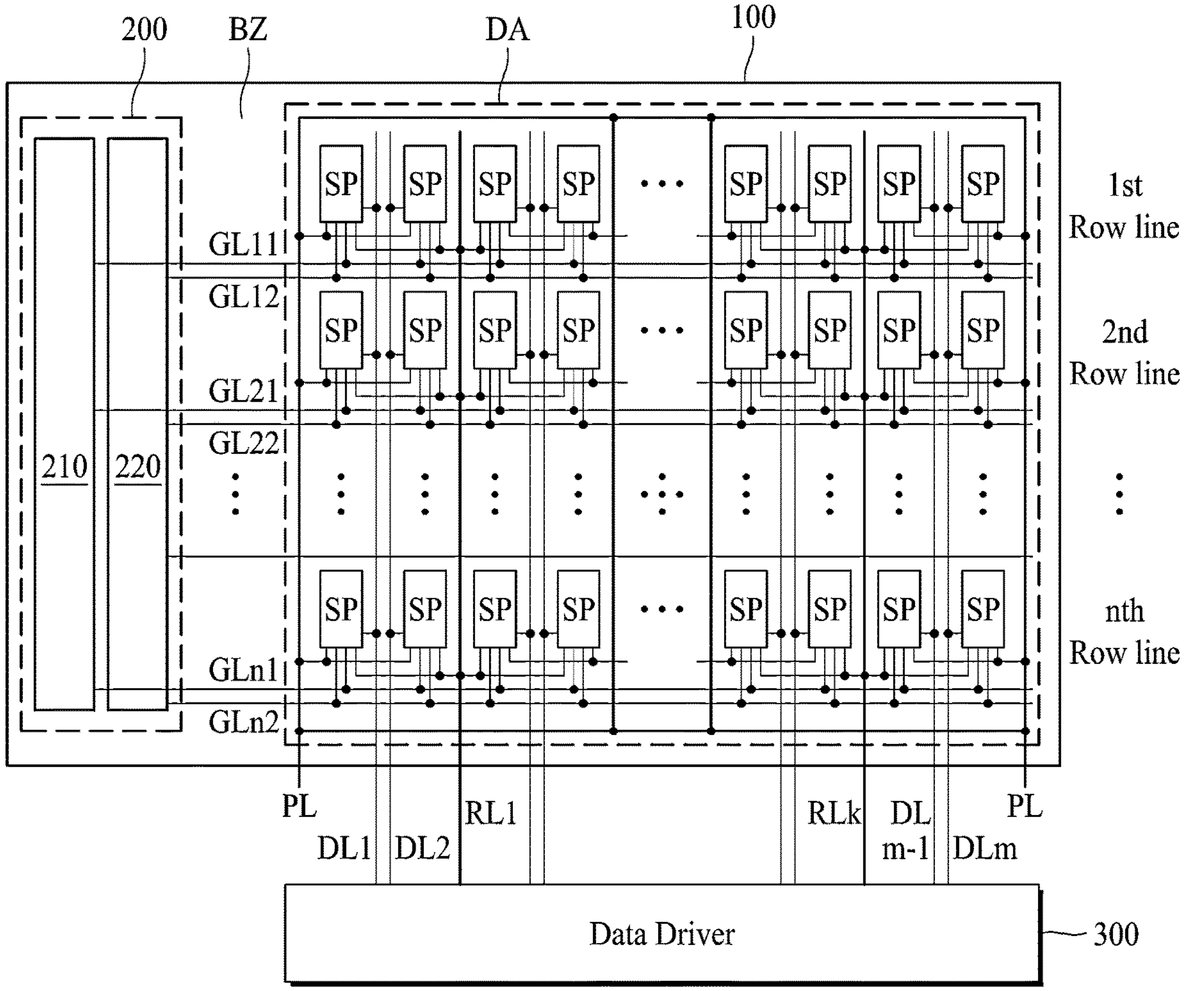
FIG. 2 is an example diagram illustrating a configuration of a display panel according to one embodiment of the present disclosure.
Figure 3:
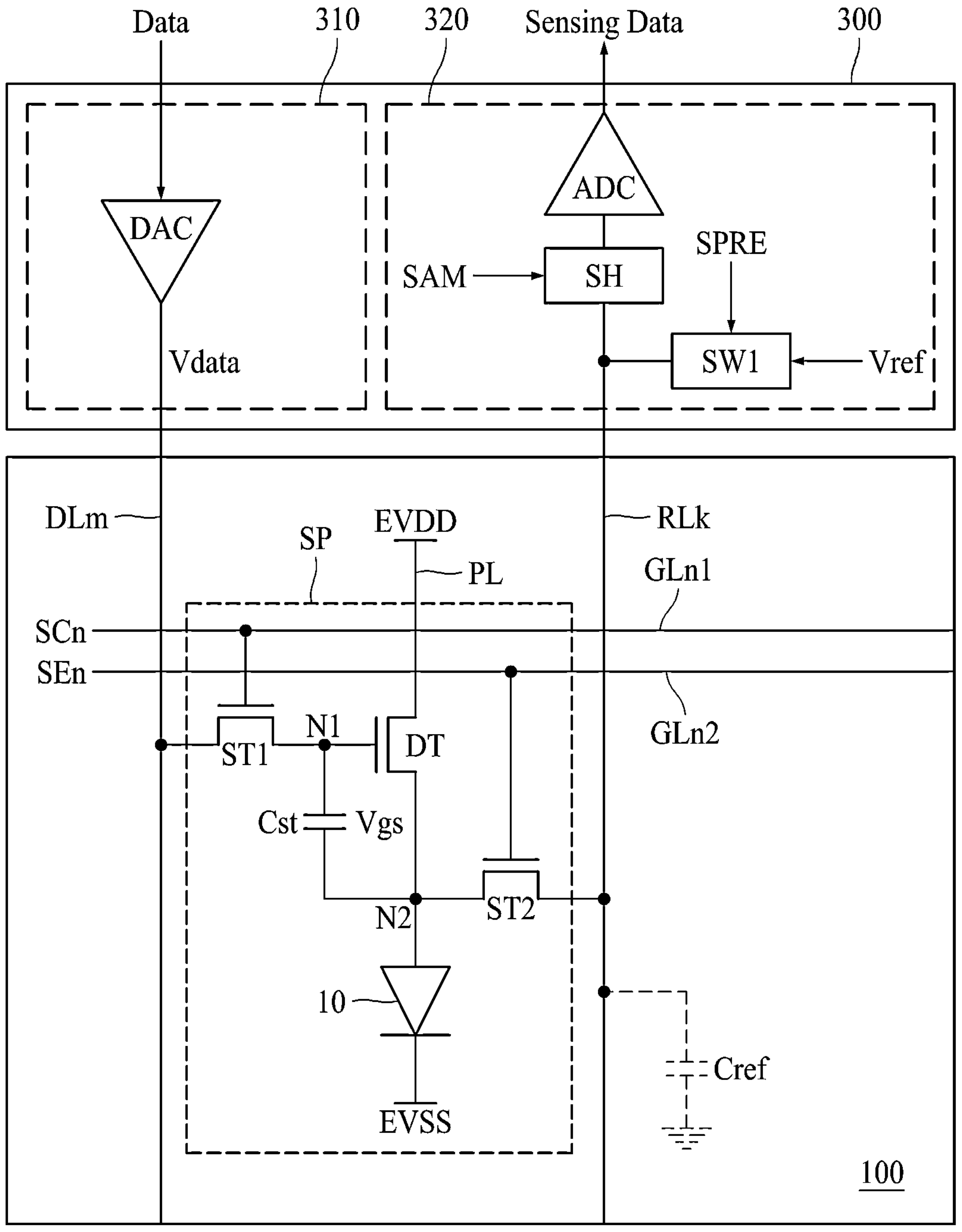
FIG. 3 is an example diagram illustrating a partial configuration of a pixel circuit and a data driver according to one embodiment of the present disclosure.
Figure 4:
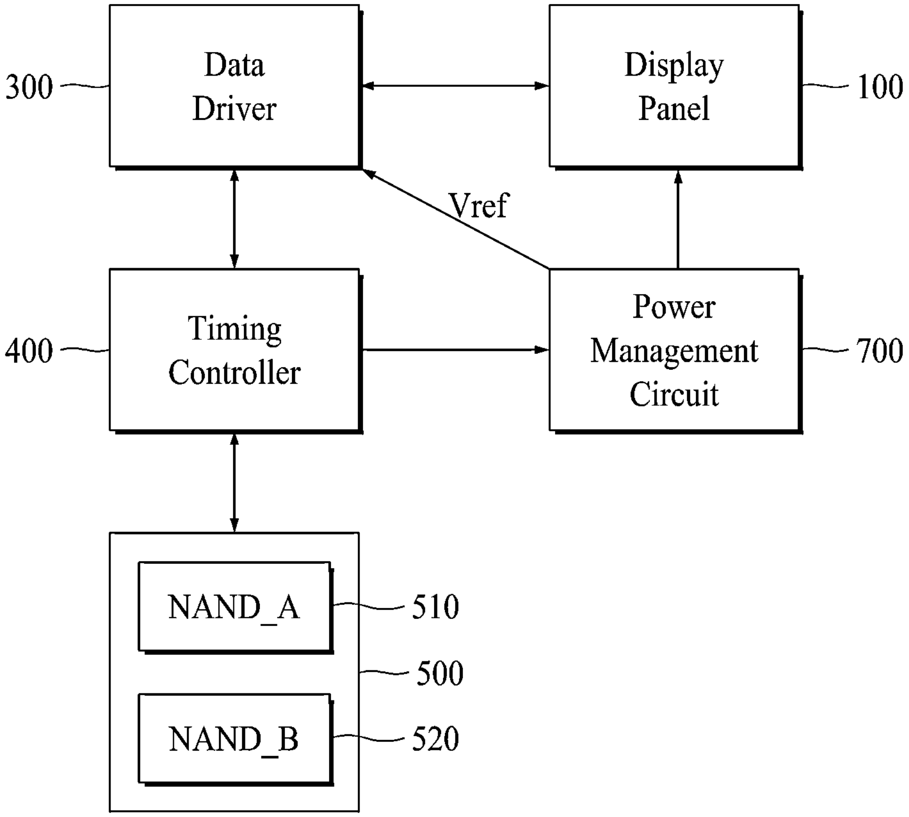
FIG. 4 is a block diagram illustrating a Vth sensing process of the display device according to one embodiment of the present disclosure.
Figure 5:
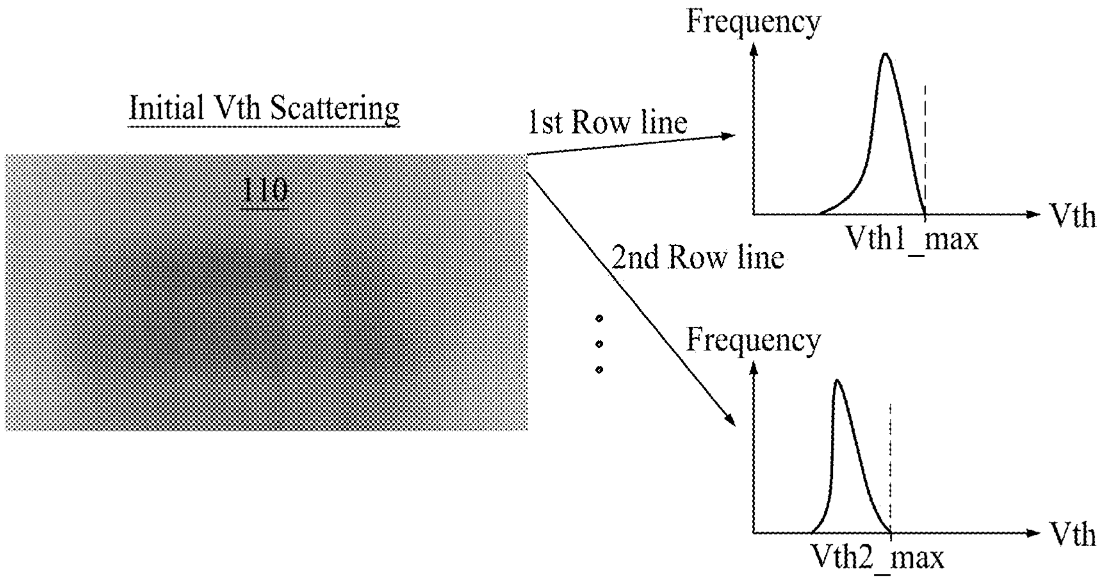
FIG. 5 is an example diagram illustrating a method for detecting a Vth maximum value for each row line by the use of initial Vth scattering in the display device according to one embodiment of the present disclosure.

FIG. 1 is a block diagram schematically illustrating a configuration of a display device according to one embodiment of the present disclosure, FIG. 2 is an example diagram illustrating a configuration of a display panel according to one embodiment of the present disclosure, and FIG. 3 is an example diagram illustrating a partial configuration of a pixel circuit and a data driver according to one embodiment of the present disclosure. FIG. 4 is a block diagram illustrating a Vth sensing process of the display device according to one embodiment of the present disclosure, and FIG. 5 is an example diagram illustrating a method for determining a reference voltage of a Vth sensing mode in the display device according to one embodiment of the present disclosure.

A display device according to one embodiment of the present disclosure can be an electroluminescent display device. The electroluminescent display device can be an organic light emitting diode OLED display device, a quantum dot light emitting diode display device, or an inorganic light emitting diode display device.

Referring to FIGS. 1 to 3, the display device includes a display panel 100, a gate driver 200, a data driver 300, a timing controller 400, a memory 500, a gamma voltage generator 600, a level shifter 800, and a power management circuit 700. According to one embodiment of the present disclosure, the gate driver 200 and the data driver 300 can be comprehensively expressed as a panel driver for driving the display panel 100. According to one embodiment of the present disclosure, the gate driver 200, the data driver 300, the timing controller 400, the gamma voltage generator 600, and the level shifter 800 can be comprehensively expressed as a display driver.

The display panel 100 can be a rigid display panel or can be a flexible display panel, such as a foldable display panel, a bendable display panel, a rollable display panel, and a stretchable display panel.

The display panel 100 can include a display area DA and a bezel area BZ positioned in the periphery to surround the display area DA.

The display panel 100 can display an image through the display area DA in which a plurality of subpixels SP are arranged in a matrix configuration. According to one embodiment of the present disclosure, the display panel 100 can further include a touch sensor screen disposed in the display area DA to sense a user's touch.

Each subpixel SP disposed in the display area DA can be any one of a red R subpixel for emitting red light, a green G subpixel for emitting green light, a blue B subpixel for emitting blue light, and a white W subpixel for emitting white light.

A unit pixel can include a plurality of subpixels SP capable of emitting light of different colors to realize white light. For example, the unit pixel can include first to fourth type subpixels SP for emitting light of different colors. The first to fourth type subpixels SP can be the R subpixel, the G subpixel, the B subpixel, and the W subpixel. The first to fourth type subpixels SP can be arranged in various orders such as R/W/B/G, R/G/B/W, W/B/G/R, or R/W/G/B. However, this is merely an example, and the configuration and arrangement of the unit pixels are not limited thereto. For example, the unit pixel can be composed of at least two of the R subpixel, the G subpixel, and the B subpixel.

Referring to FIG. 2, in the display area DA according to one embodiment of the present disclosure, first to fourth type subpixels SP can be alternately arranged in a first direction X, and subpixels SP having the same color can be repeatedly arranged in a second direction Y. The subpixels SP arranged as a matrix configuration in the display area DA can constitute a plurality of 'n' row lines and a plurality of 'm', column lines, where 'n' and 'in' are natural numbers.

The display area DA can include first type gate lines GL11 to GLn1, second type gate lines GL12 to GLn2, data lines DL1 to DLm, reference lines RL1 to RLk ('k' is a natural number), and first power lines PL.

The subpixels SP of each row line arranged in the first direction X of the display area DA can be commonly connected to the first type gate line GLi1 (i=1~n) and the second type gate line GLi2 (i=1~n). The subpixels SP of each column line arranged in the second direction Y can be commonly connected to each data line DLi (i=1~m). The subpixels SP of each column line or the plurality of column lines can be commonly connected to each reference line RLi (i=1~k). The subpixels SP of each column line or the plurality of column lines can be commonly connected to the first power line PL. According to one embodiment of the present disclosure, the first power line PL can be arranged in a mesh structure to be commonly connected to the plurality of subpixels SP. In one embodiment of the present disclosure, the subpixels SP of the (4i−3)th, (4i−2)th, (4i−1)th, and (4i)th column lines can be commonly connected to each reference line RLi (i=1~k).

Each subpixel SP can include a light emitting element and a pixel circuit for independently driving the light emitting element. In one embodiment of the present disclosure, the pixel circuit can include a driving transistor DT, a plurality of switching transistors ST1 and ST2, and a storage capacitor Cst, as shown in FIG. 3. According to one embodiment of the present disclosure, the pixel circuit can have various circuit configurations including a plurality of switching transistors which respectively initialize three electrodes (gate, source and drain) of the driving transistor or control the light emitting time of the light emitting element.

The subpixel SP according to one embodiment of the present disclosure can be connected to the first type gate line GLn1 for supplying a scan signal SCn, the second type gate line GLn2 for supplying a sensing control signal SEn, the data line DLm for supplying a data signal Vdata, the reference line RLk for supplying a reference voltage Vref, the first power line PL for supplying a first power voltage EVDD, and the second power line for supplying a second power voltage EVSS.

The light emitting element 10 can include a first electrode connected to a source node N2 of the driving transistor DT, a second electrode receiving the second power voltage EVSS, and a light emitting layer between the first electrode and the second electrode. The first electrode can be an anode electrode independently disposed in each subpixel SP. The second electrode can be a cathode electrode or common electrode shared by the entire subpixels SP and can be connected to the second power line. When a current is supplied from the driving transistor DT, an exciton is generated by combining electrons injected into the light emitting layer from the cathode electrode and holes injected into the light emitting layer from the anode electrode, and fluorescent or phosphorescent materials of the light emitting layer are emitted while the generated exciton drops from an excited state to a ground state, whereby the light emitting element 10 generates light of brightness proportional to the amount of current. An organic light emitting diode, a quantum dot light emitting diode, or an inorganic light emitting diode can be applied to the light emitting element 10.

The first switching transistor ST1 can be driven by the scan signal SCn supplied from the gate driver 200 to the first type gate line GLnT, and the first switching transistor ST1 can supply the data voltage Vdata, supplied from the data driver 300 to the data line DLm, to a gate node N1 of the driving transistor DT.

The second switching transistor ST2 can be driven by the sensing control signal SEn supplied from the gate driver 200 to the second type gate line GLn2, and the second switching transistor ST2 can supply the reference voltage Vref, supplied from the data driver 300 to the reference line RLk, to the source node N2 of the driving transistor DT. The second switching transistor ST2 can provide a signal, to which the characteristic of the driving transistor DT or the characteristic of the light emitting element 10 is reflected, to the reference line RLk for a sensing mode.

The storage capacitor Cst can be connected between the gate node N1 of the driving transistor DT and the source node N2 of the driving transistor DT. The storage capacitor Cst can charge a difference voltage between the data voltage Vdata and the reference voltage Vref which are respectively supplied to the gate node N1 and the source node N2 through the first and second switching transistors ST1 and ST2 with a driving voltage Vgs of the driving transistor DT. The storage capacitor Cst can hold the driving voltage Vgs during a light emission period in which the first and second switching transistors ST1 and ST2 are turned-off.

The driving transistor DT can control the amount of current flowing from the first power line PL to the light emitting element 10 according to the driving voltage Vgs supplied from the storage capacitor Cst, and then drives the light emitting element 10, to thereby control a light emitting intensity of the light emitting element 10.

The gate driver 200 can be disposed in at least one of the plurality of bezel areas BZ located in the periphery of the display area DA on the display panel 100. For example, the gate driver 200 can be disposed in any one of the first and second bezel areas facing each other with the display area DA interposed therebetween, or can be disposed at both sides of the first and second bezel areas.

The gate driver 200 can be embedded into the bezel area BZ of the display panel 100 in a Gate-In-Panel GIP type including transistors formed in the same process as the transistors of the display area DA.

The display area DA of the display panel 100 and the plurality of transistors disposed in the bezel area BZ including the gate driver 200 can include at least one of a polysilicon transistor using a polysilicon semiconductor layer and an oxide transistor using a metal oxide semiconductor layer.

The gate driver 200 can receive gate control signals supplied from the timing controller 400 through the level shifter 800, thereby individually driving the first type gate lines GL11 to GLn1 and the second type gate lines GL12 to GLn2. According to one embodiment of the present disclosure, the gate driver 200 can receive the gate control signals from the timing controller 400 and can operate according to the gate control signals.

According to one embodiment of the present disclosure, the gate driver 200 can comprise a scan driver 210 for individually driving the first type gate lines GL11 to GLn1, and a sensing control driver 220 for individually driving the second type gate lines GL12 to GLn2.

The scan driver 210 can receive first type gate control signals supplied from the timing controller 400 through the level shifter 800, to thereby supply the scan signal to each of the first type gate lines GLI1 to GLn1.

The sensing control driver 220 can receive second type gate control signals supplied from the timing controller 400 through the level shifter 800, to thereby supply the sensing control signal to each of the second type gate lines GL12 to GLn2.

The level shifter 800 can receive the control signals from the timing controller 400 and can level-shift or logic-process to generate the first and second type gate control signals and to supply the gate control signals to the gate driver 200, that is, the first and second type gate drivers 210 and 220. According to one embodiment of the present disclosure, the level shifter 800 can be embedded in the power management circuit 700.

The gamma voltage generator 600 can generate a plurality of reference gamma voltages having different voltage levels and can supply the reference gamma voltages to the data driver 300. The gamma voltage generator 600 can generate the plurality of reference gamma voltages corresponding to the gamma characteristics of the display device under the control of the timing controller 400 and can supply the reference gamma voltages to the data driver 300. According to one embodiment of the present disclosure, the gamma voltage generator 600 can adjust levels of the reference gamma voltages according to gamma data supplied from the timing controller 400 and can output the reference gamma voltages to the data driver 300.

The data driver 300 can drive the data lines DL1 to DLm of the display panel 100 under the control of the timing controller 400. The data driver 300 can drive and sense the reference lines RL1 to RLk according to the control of the timing controller 400 and can output the sensing data to the timing controller 400.

The data driver 300 can convert digital data supplied from the timing controller 400 into an analog data voltage by using a digital-to-analog converter DAC under the control of the timing controller 400, and can supply the data voltage to each of the data lines DL1 to DLm of the display panel 100. The data driver 300 can subdivide the plurality of reference gamma voltages supplied from the gamma voltage generator 600 and can convert the digital data into the analog data voltage by using the subdivided gamma voltages.

According to the control of the timing controller 400, the data driver 300 can supply the reference voltage Vref supplied from the power management circuit 700 to the reference lines RL1 to RLk of the display panel 100. The level of the reference voltage Vref supplied from the power management circuit 700 can vary according to an operation mode of the display panel 100 controlled by the timing controller 400. In other words, the value of the reference voltage Vref can be dynamically changed, according to an embodiment.

According to the control of the timing controller 400, the data driver 300 can sense the signal, in which the driving characteristics of each subpixel SP is reflected, through the reference lines RL1 to RLk in a voltage sensing method or a current sensing method. The driving characteristics of each subpixel SP can include at least one of Vth and mobility of the driving transistor DT and a degradation degree (threshold voltage) of the light emitting element 10. The data driver 300 can convert the signal sensed from each subpixel SP into the sensing data by using an analog-to-digital converter ADC and can transmit the sensing data to the timing controller 400.

The power management circuit 700 can generate and output various driving voltages EVDD, EVSS, . . . Vref required for operations of all circuit configurations of the display device, that is, the display panel 100 and display drivers 200 to 600 and 800 by using an input voltage. The power management circuit 700 can generate the reference voltage Vref having the voltage level varied according to the control of the timing controller 400 and can output the reference voltage Vref to the data driver 300.

When the display panel 100 operates in a normal mode for displaying an image, the data driver 300 can be supplied with the reference voltage Vref of the first type level from the power management circuit 700 and can supply the reference voltage to the reference lines RL1 to RLk.

When the display panel 100 operates in a sensing mode, the data driver 300 can be supplied with the reference voltage Vref of the second type level from the power management circuit 700 and can supply the reference voltage to the reference lines RL1 to RLk, and the second type level of the reference voltage Vref can be varied according to the control of the timing controller 400 during the sensing mode.

When the display panel 100 operates in the Vth sensing mode, the data driver 300 can be supplied with the reference voltage Vref whose voltage level is varied or adjusted for each sensing period of each row line from the power management circuit 700 and can supply the corresponding reference voltage Vref to the reference lines RL1 to RLk. The level of the reference voltage Vref supplied to each sensing period of each row line from the power management circuit 700 can be detected in an initial Vth scattering or a previous Vth sensing mode and is set for each row line based on a stored Vth setting value for each row line, so that it is possible to shorten a Vth sensing time. A detailed description thereof will be provided below.

According to one embodiment of the present disclosure, a Vth setting value for each row line can be a representative value of any one of Vth values of the corresponding row line, such as a maximum value of Vth values of the corresponding row line, an average value, or a Vth having a maximum frequency. Hereinafter, the Vth maximum value can be described as an example of Vth setting value for each row line.

The timing controller 400 can be supplied with timing control signals and image data from a host system. The host system can be any one of a computer, a TV viewing system, a set-top box, or a mobile terminal system such as a tablet or a mobile phone.

The timing controller 400 can control the gate driver 200 and the data driver 300 by the use of the received timing control signals and timing setting information stored therein. The timing control signals can include a dot clock, a data enable signal, a vertical synchronization signal, a horizontal synchronization signal, and the like.

The timing controller 400 can generate the control signals for the timing control and can supply the control signals to the level shifter 800 to generate the plurality of gate control signals in the level shifter 800 and to supply the gate control signals to the gate driver 200. According to one embodiment of the present disclosure, the timing controller 400 can generate the plurality of gate control signals and can supply the gate control signals to the gate driver 200.

The timing controller 400 can generate the plurality of data control signals for controlling the driving timing of the data driver 300 and can supply the data control signals to the data driver 300.

The timing controller 400 can receive input image data and can perform at least one of various image processes including an image quality correction, a deterioration correction, a luminance correction for reducing power consumption, and the like.

The timing controller 400 applies the compensation data of each subpixel SP stored in the memory 500 to the image-processed data, thereby compensating for the characteristic deviation of each subpixel SP and outputting the compensated data to the data driver 300.

The timing controller 400 can control the panel drivers 200 and 300 and the power management circuit 700, to thereby drive the display panel 100 in the sensing mode and update the compensation data stored in the memory 500. In the sensing mode, the timing controller 400 can sense Vth and mobility of the driving transistor DT in which the characteristic deviation or deterioration of each subpixel of the display panel 100 is reflected through the data driver 300 and can further sense the degree of deterioration of the light emitting element 10. The timing controller 400 can generate the compensation data for each subpixel by processing the sensing result and can store the compensation data in the memory 500.

The timing controller 400 can sense the Vth of the driving transistor DT by performing the Vth sensing mode according to a host system, a user's request or a predetermined driving sequence (e.g., at power on of the display, at power off of the display, or at other timings during operation, such as periodic timings). According to one embodiment of the present disclosure, the timing controller 400 can sense the Vth of each driving transistor DT by performing the Vth sensing mode for a power-off time period of the display device, and can update and store the compensation data in the memory 500 by using the sensing result.

Referring to FIGS. 4 and 5, the timing controller 400 can detect the Vth maximum value, which is the Vth setting value of each row line, by using the initial Vth scattering of the display panel 100 generated during a manufacturing process of the display device and can store the Vth maximum value in advance.

The timing controller 400 can detect and store the Vth maximum value (Vth1_max, Vth2_max, . . . ) of each row line from the initial Vth scattering information 110 generated through the sensing of the display panel 100 in the manufacturing process. The timing controller 400 can detect and store the Vth maximum value (Vth1_max, Vth2_max, . . . ) of each row line from the initial Vth scattering, which shows the initial Vth and frequency of the driving transistors DT in each of the row lines ($1^{st}$ row line, $2^{nd}$ row line, . . . ).

When the display device is driven, the timing controller 400 can detect the setting value (maximum value) among the Vth values of each row line sensed in the Vth sensing mode, and can update the Vth setting value (maximum value) for each row line.

The timing controller 400 can set the level of the reference voltage Vref for each row line based on the stored Vth setting value (maximum value) for each row line and can transmit the level of the reference voltage to the power management circuit 700. In other words, each row line can have a different Vth setting value. According to one embodiment of the present disclosure, the timing controller 400 can set the level of the reference voltage for each row line to be the same as or similar to a value obtained by subtracting the Vth setting value (maximum value) for each row line from the sensing data voltage.

The power management circuit 700 can be supplied with level information of the reference voltage Vref set for each row line from the timing controller 400 and can store the level information in an internal register.

In the Vth sensing mode, the power management circuit 700 can vary the level of the reference voltage Vref for each sensing period of each row line by using the level information of the reference voltage Vref for each row line and can supply the reference voltage Vref to the data driver 300. According to one embodiment of the present disclosure, the power management circuit 700 can generate the reference voltage Vref having a specific level for each sensing period of each row line by digital-analog-converting the level information of the reference voltage Vref for each row line, and can supply the reference voltage Vref to the data driver 300.

The data driver 300 can convert the sensing data supplied from the timing controller 400 into the data voltage for each sensing period of each row line and can supply the data voltage to the data lines of the display panel 100. The data driver 300 can receive the reference voltage Vref having a specific level from the power management circuit 700 and can supply the reference voltage Vref to the reference lines of the display panel 100 as an initialization voltage.

For each sensing period of each row line, the data driver 300 can sample the Vth sensing voltage whose charging time is shortened by increasing the voltage of the reference lines from the specific level of the reference voltage Vref by driving the driving transistor of the subpixel SP sensed in the display panel 100, and can generate the Vth sensing data and transmit the generated Vth sensing data to the timing controller 400. Accordingly, the Vth sensing time of the driving transistor in the data driver 300 can be shortened.

According to one embodiment of the present disclosure, the data driver 300 can compare the plurality of sensing data generated by repeatedly sampling the voltage of the reference line at different sampling times in the sensing period of each row line. The data driver 300 can determine the sensing data of the current sampling time having the minimum deviation as compared to the sensing data of the previous sampling time as the Vth sensing data, thereby minimizing the Vth sensing time.

The timing controller 400 can generate the Vth based on the Vth sensing data supplied from the data driver 300 and can store the Vth in the memory 500. The timing controller 400 can detect the setting value (maximum value) among the Vth values of each row line and can update the Vth setting value (maximum value) for each row line.

The timing controller 400 can store the Vth values sensed for the first Vth sensing mode in a NAND_A 510, which is the first NAND memory, and then can use the stored Vth values when the display device is driven. The timing controller 400 can store the Vth values sensed for the second Vth sensing mode in a NAND_B 520, which is a second NAND memory, and then can use the stored Vth values when the display device is driven. Accordingly, it is possible to prevent a collision between the Vth stored for the Vth sensing mode and the Vth to be read.

For the Vth sensing mode, the timing controller 400 can control the panel driver (gate driver 200 and data driver 300) to sequentially drive and can sense the row lines (1st row line, 2nd row line, . . . ) of the display panel 100.

According to one embodiment of the present disclosure, the timing controller 400 can control the panel drivers 200 and 300 to sequentially sense the Vth of the driving transistor in the subpixels SP of the display panel 100 for each color. In one embodiment of the present disclosure, when the display panel 100 can include first to fourth types subpixels including red, white, blue, and green subpixels, the timing controller 400 can control the panel drivers 200 and 300, thereby sequentially sensing the first type subpixels in the first sensing frame, sequentially sensing the second type subpixels in the second sensing frame, sequentially sensing the third type subpixels in the third sensing frame, and then sequentially sensing the fourth type subpixels in the fourth sensing frame. For example, each of the different colored subpixels can be sampled during different sensing frames.

Figure 6:
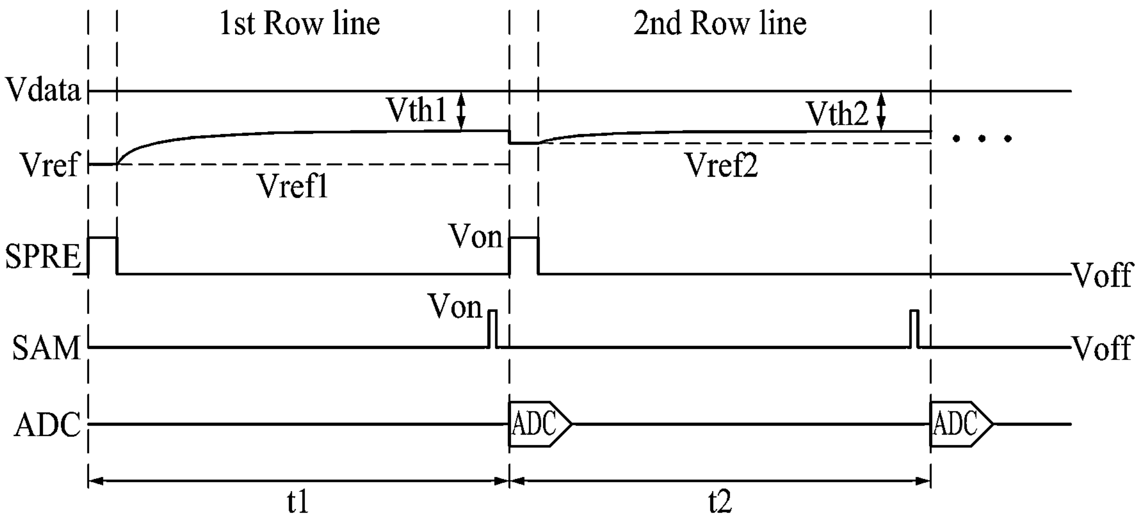
FIG. 6 is an example driving waveform diagram illustrating a Vth sensing method of a data driver according to one embodiment of the present disclosure.
Figure 7:
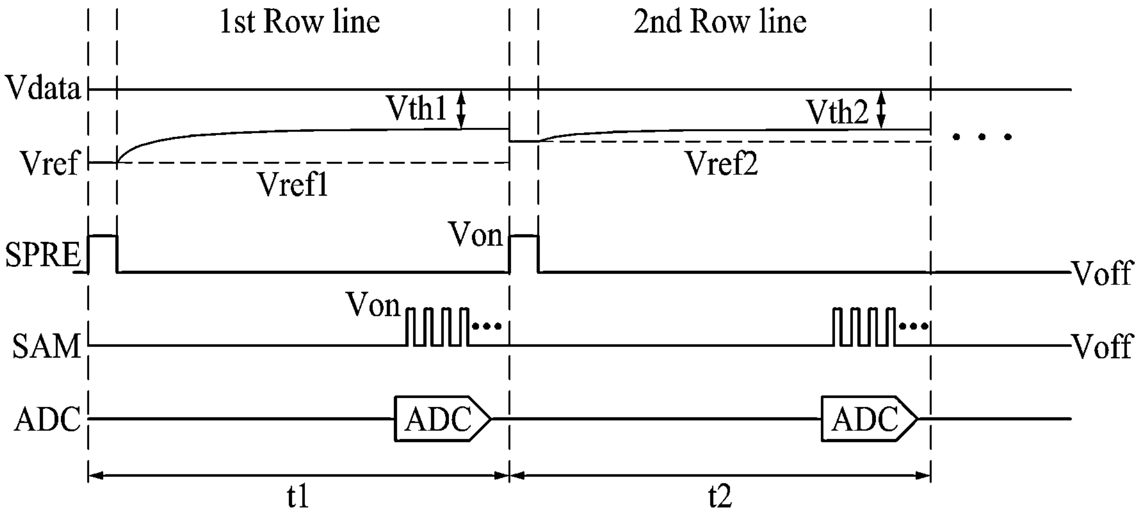
FIG. 7 is an example driving waveform diagram illustrating a Vth sensing method of a data driver according to one embodiment of the present disclosure.
Figure 8:
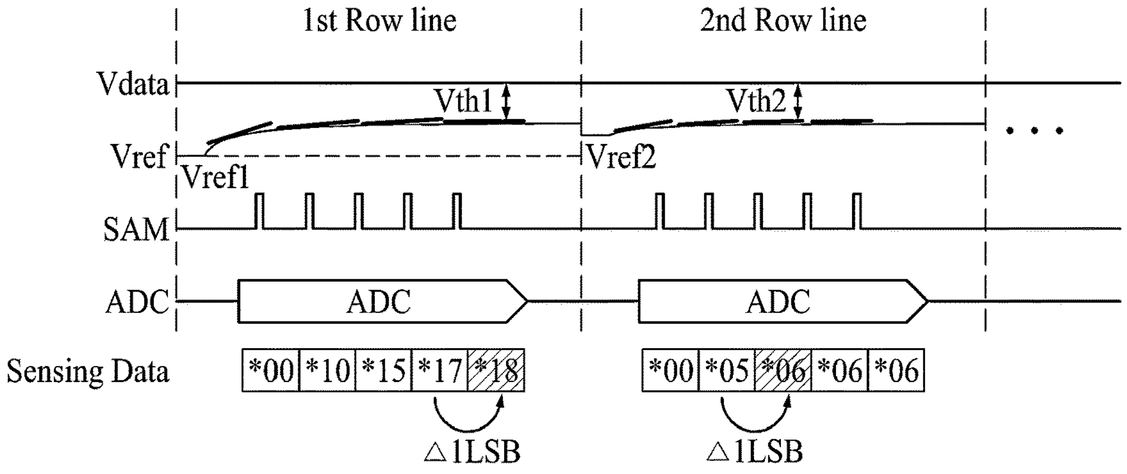
FIG. 8 is an example driving waveform diagram illustrating a Vth sensing method of a data driver according to one embodiment of the present disclosure.

FIGS. 6 to 8 are driving waveform diagrams illustrating Vth sensing methods of the data drivers according to embodiments of the present disclosure, which will be described with reference to FIGS. 1 to 3.

The display device according to one embodiment of the present disclosure can operate in the Vth sensing mode under the control of the timing controller 400. For the Vth sensing mode, the gate driver 200 and the data driver 300 can sequentially drive and sense the row lines (1st row line, 2nd row line, . . . ) of the display panel 100.

As shown in FIG. 3, the data driver 300 can include a driving circuit portion 310 for driving the data line, and a sensing circuit portion 320 for driving and sensing the reference line RLk. The drive circuit portion 310 can include a digital-to-analog converter DAC. The sensing circuit portion 320 can include a first switch SW1, a sampling and hold circuit SH, and an analog-to-digital converter ADC.

The first switch SW1 can be controlled by an initialization control signal SPRE, and a sampling switch of the sampling and hold circuit SH can be controlled by a sampling control signal SAM. The first switch SW1 can be turned-on during an initialization period in which the initialization control signal SPRE has a gate-on voltage Von during the sensing period of each row line and can be turned-off in a remaining period in which the initialization control signal SPRE has a gate-off voltage Voff During the sensing period of each row line, the sampling switch included in the sampling and hold circuit SH can be turned-on in a sampling period in which the sampling control signal SAM has a gate-on voltage Von and can be turned-off in a remaining period in which the sampling control signal SAM has a gate-off voltage Voff. The initialization control signal SPRE and the sampling control signal SAM can be supplied from the data driver 300 or the timing controller 400.

The sensing period of each row line can include an initialization period, a charging period, and a sampling period which sequentially follow.

During the sensing period of each row line, a row line selected by the sensing control signal SEn and the scan gate signal SCn of the gate driver 200 can be driven and sensed by the data driver 300.

During the sensing period of each row line, the driving circuit portion 310 of the data driver 300 can convert the sensing data received from the timing controller 400 into a sensing data voltage Vdata through the digital-to-analog conversion unit DAC and can supply the sensing data voltage Vdata to the data line DLm.

The sensing circuit portion 320 of the data driver 300 can be supplied with the reference voltage Vref having a specific level set for each row line from the power management circuit 700 during the initialization period in the sensing period of each row line, can supply the above reference voltage Vref having a specific level as the initialization voltage to the reference line through the first switch SW1, and then can float the reference line RLk in the subsequent charging period. In other words, different row lines can be supplied with different reference voltages Vref.

During the charging period in the sensing period of each row line, the driving transistor DT can be driven by the sensing data voltage Vdata supplied through the first switching transistor ST1. The voltage of the source node N2 and the reference line RLk can be increased from the specific level of the reference voltage Vref to the Vth sensing voltage by driving the driving transistor DT. The Vth sensing voltage can be a voltage 'Vdata-Vth' having a Vth difference from the sensing data voltage Vdata supplied to the gate node N1 of the driving transistor DT. The Vth sensing voltage can be charged to the reference line RLk, that is, line capacitor Cref of the reference line RLk.

During the sampling period in the sensing period of each row line, the sensing circuit portion 320 of the data driver 300 can sample the Vth sensing voltage charged in the reference line RLk through the sampling and hold circuit SH and can convert the Vth sensing voltage into the Vth sensing data through the analog-to-digital converter ADC. The Vth sensing data of the data driver 300 can be transmitted to the timing controller 400.

In the Vth sensing mode of the display device according to one embodiment of the present disclosure, since the voltage of the reference line RLk is raised and charged from a specific level set based on the Vth maximum value for each row line in each sensing period of each row line, the charging time of the reference line RLk can be shortened and the sensing time of each row line can be reduced from tens of 'ms' to several 'ms'. In other words, instead of applying the same reference voltage Vref to all of the row lines, each row line can be applied with a specific level of the reference voltage Vref that is unique to that specific row line and best addresses the needs of that specific row line, in order to further shorten and optimize the amount of time it takes to sense the pixels.

For example, in the sensing period 11 of the first row line (1st Row line), the reference voltage Vref applied as the initialization voltage to the reference line RLk can have a first specific level Vref1 set based on a previous Vth maximum value of the first row line. Thus, in the sensing period t1 of the first row line, the voltage of the reference line RLk can rise from the first specific level Vref1 of the reference voltage Vref, thereby shortening the charging time of the reference line RLk.

In the sensing period t2 of the second row line (2nd Row line), the reference voltage Vref applied as the initialization voltage to the reference line RLk can have a second specific level Vref2 set based on a previous Vth maximum value of the second row line. For example, the second specific level Vref2 can be higher than the first specific level Vref1. Thus, in the sensing period t2 of the second row line, the voltage of the reference line RLk can rise from the second specific level Vref2 higher than the first specific level Vref1 of the reference voltage Vref, thereby further shortening the charging time of the reference line RLk. In other words, if the same first specific level Vref1 were also applied to the second row line, it would take longer to charge. Thus, according to an embodiment, each row line can be applied with a different specific level Vref that is best suited for that row line.

Referring to FIGS. 7 and 8, according to one embodiment of the present disclosure, the sensing circuit portion 320 of the data driver 200 can generate and store the plurality of sensing data by sampling the voltage charged in the reference line RLk at a plurality of sampling times through a plurality of sampling operations during the sampling period of the sensing period of each row line. By comparing the plurality of sensing data, the sensing circuit portion 320 of the data driver 300 can determine the sensing data of the (N)th sampling time having the minimum deviation from the sensing data of the (N−1)th sampling time (herein, 'N' is an integer greater than 2) as the Vth sensing data. The sensing circuit portion 320 of the data driver 300 can transmit the determined Vth sensing data to the timing controller 400, so that the Vth sensing time of each row line can be further shortened and minimized.

For example, the minimum deviation can be set to Δ1LSB corresponding to the minimum variance value. Most of the time of the Vth sensing time of the driving transistor can be consumed by the charging time at the Vth voltage. In this situation, the variation (1 ms unit) of the sensing voltage can be about 3 mV, which can have Δ1LSB corresponding to the minimum deviation.

Referring to FIG. 8, during the sampling period in the sensing period t1 of the first row line (1st Row line), the sensing circuit portion 320 can generate and store first to fifth sensing data (*00, *10, *15, *17, *18) by sampling the voltage charged in the reference line RLk at first to fifth sampling times, respectively. The sensing circuit portion 320 can compare the first to fifth sensing data (*00, *10, *15, *17, *18) and can determine the fifth sensing data (*18) having the minimum deviation Δ1LSB from the fourth sensing data (*17) as the Vth sensing data.

During the sampling period in the sensing period t2 of the second row line (2nd Row line), the sensing circuit portion 320 can generate first to fifth sensing data (*00, *05, *06, *06, *06) by sampling the voltage charged in the reference line RLk at first to fifth sampling times, respectively. The sensing circuit portion 320 can compare the first to fifth sensing data (*00, *05, *06, *06, *06) and can determine the third sensing data (*06) having the minimum deviation Δ1LSB from the second sensing data (*05) as the Vth sensing data. According to one embodiment of the present disclosure, when the third sensing data sampled at the third sampling time is determined as the Vth sensing data, the sensing circuit portion 320 can stop the sampling operation of the fourth and fifth sampling times, so that the Vth sensing time can be further shortened and minimized. In other words, each row line can be sensed at its own unique timing in order to save time, e.g., the shortest possible sampling time that still satisfies the minimum deviation Δ1LSB, in order to even further shorten the sensing time of the entire panel.

As described above, in the display device according to the embodiments of the present disclosure, the Vth sensing time of the driving transistor can be shortened by using the specific level of the reference voltage Vref set for each row line as the initialization voltage of the reference lines RL1 to RLk every sensing period of each row line in the Vth sensing mode, thereby reducing tack time and power consumption. According to one embodiment of the present disclosure, even if the display panel 100 uses an oxide transistor having a low off-current Ioff, the Vth sensing time of the driving transistor can be shortened, thereby reducing tact time and power consumption of the display device.

Figure 9:
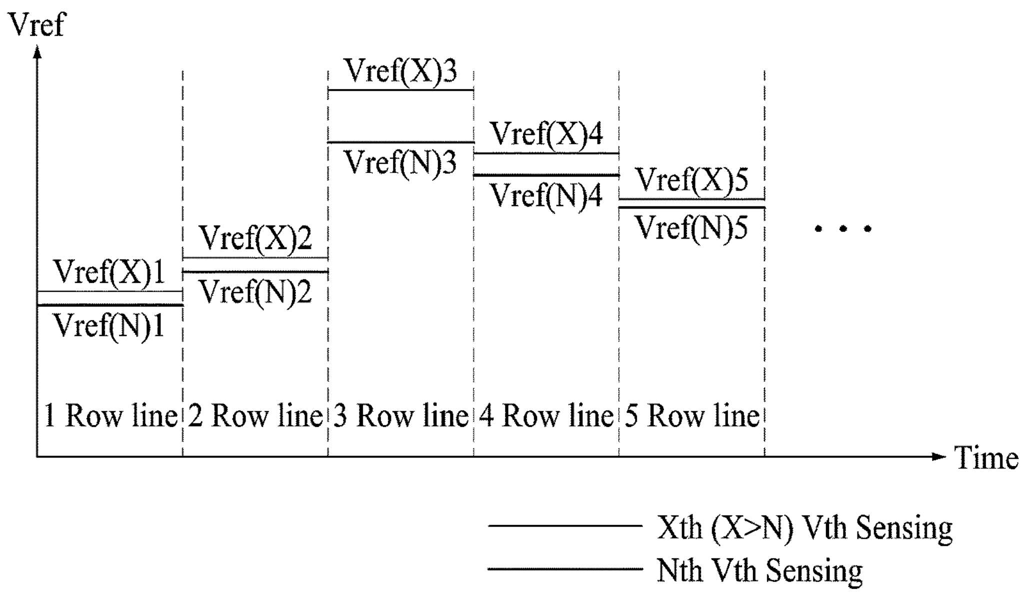
FIG. 9 is an example diagram illustrating application results of a Vth sensing method in the display device according to one embodiment of the present disclosure.

FIG. 9 is an example diagram illustrating results of the Vth sensing method of the display device according to one embodiment of the present disclosure.

Referring to FIG. 9, when the display device according to one embodiment of the present disclosure operates in the (N)th Vth sensing mode, the specific levels (Vref (N)1, Vref(N)2, Vref(N)3, Vref(N)4, Vref(N)5, . . . ) of the reference voltage applied to the display panel 100 from the power management circuit 700 through the data driver 300 can be varied every sensing period in each of the plurality of row lines.

When the display device according to one embodiment of the present disclosure operates in the (X)th Vth sensing mode, which is increased as compared to the (N)th Vth sensing mode, the specific levels (Vref (X)1, Vref(X)2, Vref(X)3, Vref(X)4, Vref(X)5, . . . ) of the reference voltage applied to the display panel 100 from the power management circuit 700 through the data driver 300 can be varied every sensing period in each of the plurality of row lines, and the specific levels (Vref (X)1, Vref(X)2, Vref(X)3, Vref(X)4, Vref(X)5, . . . ) of the reference voltage are different from the specific levels (Vref (N)1, Vref(N)2, Vref(N)3, Vref(N)4, Vref(N)5, . . . ) of the reference voltage of the (N)th Vth sensing mode.

As described above, in the display device and the driving method thereof according to the embodiments of the present disclosure, when the Vth of the driving transistor is sensed, the Vth sensing time can be shortened by using the reference voltage having the specific level set based on the Vth setting value (maximum value) preset for each row line as the initialization voltage. In other words, each row line can be applied with a reference voltage that his is own specific level set for that specific row line, in order to best shorten the time it takes to accurately sample the pixels for that specific row line.

According to the embodiments of the present disclosure, the display device and the driving method thereof can generate the plurality of sensing data by sampling the sensing voltage at different sampling times in the sensing period of each row line, can compares the plurality of sensing data, and can determines the sensing data of the current sampling time having the minimum deviation from the sensing data of the previous sampling time as the Vth sensing data, to thereby minimizing the Vth sensing time. In other words, in addition to applied a unique reference voltage having a specific level to each row line, each row line can also be sampling at a different timing that is unique to that row line while still maintaining accuracy, in order to even further shorten the amount of time it takes to sense the Vth of all the pixels in the display panel.

The display device and the driving method thereof according to the embodiments of the present disclosure can reduce tact time and power consumption of the display device by shortening or minimizing the Vth sensing time of the driving transistor.

A display device according to some embodiments can include a display panel having subpixels, each of the subpixels including a driving transistor; a data driver configured to drive data lines and reference lines connected to the subpixels in the display panel; a timing controller configured to control the data driver; and a power management circuit configured to supply a reference voltage to the reference lines of the display panel through the data driver. The data driver can be configured to receive the reference voltage having of a first specific level for a first row line of the subpixels from the power management circuit and supply the reference voltage of the first specific level to the first row line as an initialization voltage during a threshold voltage sensing mode, and receive the reference voltage of a second specific level for a second row line of the subpixels from the power management circuit and supply the reference voltage of the second specific level to the second row line as the initialization voltage during the threshold voltage sensing mode, and wherein the reference voltage of the first specific level is different than the reference voltage of the second specific level.

In the display device according to some embodiments, the power management circuit can be further configured to vary the reference voltage to generate a varied reference voltage for each sensing period of each row line of the subpixels and supply the varied reference voltage to the data driver.

In the display device according to some embodiments, the timing controller can be further configured to detect a threshold voltage setting value for each row line of the subpixels by using a threshold voltage maximum value of each row line from an initial threshold voltage scattering of the display panel, and store the threshold voltage setting value for each row line in a memory, and set a specific level of the reference voltage for each row line based on the stored threshold voltage maximum value of each row line and transmit a corresponding specific level of the reference voltage for each row line to the power management circuit.

In the display device according to some embodiments, the timing controller may be further configured to detect and store a threshold voltage maximum value of each row line of the subpixels as a threshold voltage setting value in a memory, during a first threshold voltage sensing mode, and set a specific level of the reference voltage for each row line based on the threshold voltage maximum value of each row line stored in the memory during the first threshold voltage sensing mode and may transmit the specific level of the reference voltage to the power management circuit.

In the display device according to some embodiments, the power management circuit can be further configured to receive and store setting information of the specific level of the reference voltage for each row line of the subpixels from the timing controller in a memory, and generate the specific level of the reference voltage for each row line by converting the setting information stored for each row line into an analog voltage for each row line, and supply the specific level of the reference voltage for each row line to the data driver.

In the display device according to some embodiments, the data driver can be further configured to sample a threshold voltage sensing voltage charged in the reference lines based on an increase from the specific level of the reference voltage for each row line, convert the threshold voltage sensing voltage into threshold voltage sensing data, and transmit the threshold voltage sensing data to the timing controller.

In the display device according to some embodiments, the data driver can be further configured to generate sensing data by sampling voltages charged in the reference lines at a plurality of different sampling times based on an increase from a specific level of the reference voltage for a corresponding row line of subpixels, and determine sensing data of an (N)th sampling time having a minimum deviation from sensing data of an (N−1)th sampling time as threshold voltage sensing data for the corresponding row line, and transmit the threshold voltage sensing data of the corresponding row line to the timing controller, where N is an integer greater than 2.

In the display device according to some embodiments, the data driver can be further configured to stop sampling of the corresponding row line after the (N)th sampling time when the sensing data of the (N)th sampling time is determined as the threshold voltage sensing data for a sensing period of the corresponding row line of subpixels.

In the display device according to some embodiments, a specific level of the reference voltage set for a sensing period of each row line of the subpixels may be the same as or similar to a level obtained by subtracting a threshold voltage setting value for each row line stored in a previous sensing mode from a sensing data voltage supplied to the data lines from the data driver.

In the display device according to some embodiments the specific level of the reference voltage for each row line of the subpixels supplied from the power management circuit to the reference lines through the data driver every sensing period of each of the row lines in a first threshold voltage sensing mode may be different from a specific level of the reference voltage for each row line supplied from the power management circuit to the reference lines through the data driver every sensing period of each of the row lines in a second threshold voltage sensing mode.

A method for driving a display device according to some embodiments can include: supplying a reference voltage of a first specific level to a first row line of subpixels as an initialization voltage during a threshold voltage sensing mode; and supplying the reference voltage of a second specific level to a second row line of the subpixels as the initialization voltage during the threshold voltage sensing mode, wherein the reference voltage of the first specific level is different than the reference voltage of the second specific level.

In the method for driving the display device according to some embodiments, the reference voltage supplied to reference lines of the subpixels may be varied every sensing period of each row line of the subpixels.

In the method for driving the display device according to some embodiments, the method can further include detecting a threshold voltage maximum value of each row line of the subpixels from an initial threshold voltage scattering of the display panel as a Vth setting value and storing the threshold voltage setting value in a memory; and setting a specific level of the reference voltage for each row line based on the corresponding threshold voltage maximum value of each row line.

In the method for driving the display device according to some embodiments, the setting the specific level of the reference voltage for each row line can include generating the specific level of the reference voltage for each row line by converting setting information for the specific level of the reference voltage for each row line to an analog voltage for each sensing period of each row line.

In the method for driving the display device according to some embodiments, the method may further include detecting and storing a threshold voltage maximum value of each row line of the subpixels as a threshold voltage setting value in a memory when operating in a first threshold voltage sensing mode; and setting a specific level of the reference voltage for each row line based on the threshold voltage maximum value of each row line stored in the first threshold voltage sensing mode when operating in a second threshold voltage sensing mode.

The method for driving the display device according to some embodiments can further include, sampling a threshold voltage sensing voltage charged in reference lines of the subpixels by an increase from the corresponding specific level of the reference voltage at every sensing period of each row line of the subpixels, after supplying the corresponding reference voltages to the reference lines of the subpixels; and converting the threshold voltage sensing voltage into threshold voltage sensing data.

The method for driving the display device according to some embodiments can further include generating the sensing data by sampling a voltage charged in a corresponding reference line of a subpixel at a plurality of different sampling times based on an increase from the corresponding specific level of the reference voltage for every sensing period of each row line of the subpixels, after supplying corresponding reference voltages to reference lines of the subpixels; and determining sensing data of an (N)th sampling time having a minimum deviation from sensing data of an (N−1)th sampling time as threshold voltage sensing data based on a comparison of the sensing data of the (N)th sampling time and the sensing data of the (N−1)th sampling time, where N is an integer greater than 2.

In the method for driving the display device according to some embodiments, the method can further include stopping a sampling operation of a corresponding row line of subpixels after the (N)th sampling time when the sensing data of the (N)th sampling time is determined as the threshold voltage sensing data in a sensing period of the corresponding row line.

In the method for driving the display device according to some embodiments, a corresponding specific level of the reference voltage set for a sensing period of each row line may be same as or similar to a level obtained by subtracting a corresponding threshold voltage setting value for each row line stored in a memory during a previous sensing mode from a sensing data voltage supplied to data lines from the data driver.

In the method for driving the display device according to some embodiments, a corresponding specific level of the reference voltage for each row line of the subpixels supplied to reference lines of the subpixels every sensing period of each of the row lines of the subpixels in a first threshold voltage sensing mode can be different from a corresponding specific level of the reference voltage for each row line supplied to the reference lines every sensing period of each of the plurality of row lines in a second threshold voltage sensing mode.

A display device according to some embodiments can include a display panel including a plurality of subpixels arranged in rows, the plurality of subpixels respectively including a plurality of driving transistors, a plurality of reference lines connected to the plurality of subpixels for supplying reference voltages for sensing threshold voltages of the plurality of driving transistors, and a data driver configured to: supply a first reference voltage to a first row of subpixels among the plurality of subpixels during a threshold voltage sensing mode, and supply a second reference voltage to a second row of subpixels among the plurality of subpixels during the threshold voltage sensing mode, wherein a voltage level of the first reference voltage is different than a voltage level of the second reference voltage.

In the display device according to some embodiments, the display device can further include a power management circuit configured to supply driving voltages to the display panel, wherein the data driver is further configured to receive the first reference voltage and the second reference voltage from the power management circuit.

In the display device according to some embodiments, the data driver can be further configured to: repeatedly sample a charged voltage in one or more reference lines among the plurality of reference lines corresponding to the first row of subpixels to generate a plurality of samples until a difference between one of the plurality of samples and a stored threshold voltage sensing data is less than or equal to a predetermined minimum deviation, and in response to the difference between the one of the plurality of samples and the stored threshold voltage sensing data being less than or equal to the predetermined minimum deviation, stop sampling the charged voltage and update the stored threshold voltage sensing data to be set to the one of the plurality of samples.

In the display device according to some embodiments, the data driver can be further configured to: sense a first maximum threshold voltage of the first row of subpixels based on the first reference voltage during a first time period to generate first threshold voltage sensing data, transmit the first threshold voltage sensing data to a timing controller, sense a second maximum threshold voltage of the second row of subpixels based on the second reference voltage during a second time period after the first time period to generate second threshold voltage sensing data, and transmit the second threshold voltage sensing data to the timing controller.

In the display device according to some embodiments, the timing controller can be configured to: receive the first threshold voltage sensing data and the second threshold voltage sensing data from the data driver, generate at least one updated reference voltage value based on comparing at least one of the first threshold voltage sensing data and the second threshold voltage with stored threshold voltage sensing data, and transmit the at least one updated reference voltage value to a power management circuit configured to supply driving voltages to the display panel.

In the display device according to some embodiments, the power management circuit can be further configured to: receive the at least one updated reference voltage value, generate a third reference voltage based on the at least one updated reference voltage value, and supply the third reference voltage to the data driver, and wherein the data driver can be further configured to: in response to receiving the third reference voltage from the power management circuit, supply the third reference voltage to at least one of the first row of subpixels or the second row of subpixels for resampling a maximum threshold voltage of the at least one of the first row of subpixels or the second row of subpixels, and wherein the third reference voltage can different than the first reference voltage and the second reference voltage.

In addition to the above-mentioned advantageous effects of the present disclosure, other features and advantages of the present disclosure will be clearly understood by those skilled in the art from the above description or explanation. Furthermore, features, structures, effects and so on exemplified in at least one example of the present disclosure can be implemented by combining or modifying other examples by a person having ordinary skilled in this field. Therefore, contents related to such combinations and modifications should be interpreted as being included in the scope of the present application.

It will be apparent to those skilled in the art that the present disclosure described above is not limited by the above-described embodiments and the accompanying drawings and that various substitutions, modifications and variations can be made in the present disclosure without departing from the spirit or scope of the disclosures. Consequently, the scope of the present disclosure is defined by the accompanying claims and it is intended that all variations or modifications derived from the meaning, scope and equivalent concept of the claims fall within the scope of the present disclosure.

What is claimed is:

1. A display device comprising:

a display panel having subpixels, each of the subpixels including a driving transistor;

a data driver configured to drive data lines and reference lines connected to the subpixels in the display panel;

a timing controller configured to control the data driver; and a power management circuit configured to supply a reference voltage to the reference lines of the display panel through the data driver, wherein the data driver is configured to:

receive the reference voltage of a first specific level for a first row line of the subpixels from the power management circuit and supply the reference voltage of the first specific level to the reference lines as an initialization voltage during a sensing period of the first row line at a threshold voltage sensing mode, and receive the reference voltage of a second specific level for a second row line of the subpixels from the power management circuit and supply the reference voltage of the second specific level to the reference lines as the initialization voltage during a sensing period of the second row line at the threshold voltage sensing mode, and wherein the reference voltage of the first specific level is different than the reference voltage of the second specific level.

2. The display device according to claim 1, wherein the power management circuit is further configured to:

vary the reference voltage to generate a varied reference voltage for each sensing period of each row line of the subpixels, and supply the varied reference voltage to the data driver.

3. The display device according to claim 1, wherein the timing controller is further configured to:

detect a threshold voltage setting value for each row line of the subpixels by using a threshold voltage maximum value of each row line from an initial threshold voltage scattering of the display panel, and store the threshold voltage setting value for each row line in a memory, and set a specific level of the reference voltage for each row line based on the stored threshold voltage maximum value of each row line and transmit a corresponding specific level of the reference voltage for each row line to the power management circuit.

4. The display device according to claim 1, wherein the timing controller is further configured to:

detect and store a threshold voltage maximum value of each row line of the subpixels as a threshold voltage setting value in a memory, during a first threshold voltage sensing mode, and set a specific level of the reference voltage for each row line based on the threshold voltage maximum value of each row line stored in the memory during the first threshold voltage sensing mode and transmit the specific level of the reference voltage to the power management circuit.

5. The display device according to claim 1, wherein the power management circuit is further configured to:

receive and store setting information of a specific level of the reference voltage for each row line of the subpixels from the timing controller in a memory, and generate the specific level of the reference voltage for each row line by converting the setting information stored for each row line into an analog voltage for each row line, and supply the specific level of the reference voltage for each row line to the data driver.

6. The display device according to claim 1, wherein the data driver is further configured to:

sample a threshold voltage sensing voltage charged in the reference lines based on an increase from the specific level of the reference voltage for each row line, convert the threshold voltage sensing voltage into threshold voltage sensing data, and transmit the threshold voltage sensing data to the timing controller.

7. The display device according to claim 1, wherein the data driver is further configured to:

generate sensing data by sampling voltages charged in the reference lines at a plurality of sampling times based on an increase from a specific level of the reference voltage for a corresponding row line of subpixels, and determine sensing data of an (N)th sampling time having a minimum deviation from sensing data of an (N-1)th sampling time as threshold voltage sensing data for the corresponding row line, and transmit the threshold voltage sensing data of the corresponding row line to the timing controller, where N is an integer greater than 2.

8. The display device according to claim 7, wherein the data driver is further configured to stop sampling of the corresponding row line after the (N)th sampling time when the sensing data of the (N)th sampling time is determined as the threshold voltage sensing data for a sensing period of the corresponding row line of subpixels.

9. The display device according to claim 1, wherein a specific level of the reference voltage set for a sensing period of each row line of the subpixels is same as or similar to a level obtained by subtracting a threshold voltage setting value for each row line stored in a previous sensing mode from a sensing data voltage supplied to the data lines from the data driver.

10. The display device according to claim 1, wherein a specific level of the reference voltage for each row line of the subpixels supplied from the power management circuit to the reference lines through the data driver every sensing period of each of the row lines in a first threshold voltage sensing mode are different from a specific level of the reference voltage for each row line supplied from the power management circuit to the reference lines through the data driver every sensing period of each of the row lines in a second threshold voltage sensing mode.

11. A method for driving a display device, the method comprising:

supplying a reference voltage of a first specific level to reference lines of subpixels as an initialization voltage during a sensing period of a first row line of the subpixels among a threshold voltage sensing mode; and supplying the reference voltage of a second specific level to the reference lines as the initialization voltage during a sensing row line of the subpixels among the threshold voltage sensing mode, wherein the reference voltage of the first specific level is different than the reference voltage of the second specific level.

12. The method according to claim 11, wherein the reference voltage supplied to reference lines of the subpixels is varied every sensing period of each row line of the subpixels.

13. The method according to claim 11, further comprising:

detecting a threshold voltage maximum value of each row line of the subpixels from an initial threshold voltage scattering of the display panel as a threshold voltage setting value and storing the threshold voltage setting value in a memory; and setting a specific level of the reference voltage for each row line based on the corresponding threshold voltage maximum value of each row line.

14. The method according to claim 13, wherein the setting the specific level of the reference voltage for each row line includes:

generating the specific level of the reference voltage for each row line by converting setting information for the specific level of the reference voltage for each row line to an analog voltage for each sensing period of each row line.

15. The method according to claim 11, further comprising:

detecting and storing a threshold voltage maximum value of each row line of the subpixels as a threshold voltage setting value in a memory when operating in a first threshold voltage sensing mode; and setting a specific level of the reference voltage for each row line based on the threshold voltage maximum value of each row line stored in the first threshold voltage sensing mode when operating in a second threshold voltage sensing mode.

16. The method according to claim 11, further comprising:

sampling a threshold voltage sensing voltage charged in reference lines of the subpixels by an increase from the corresponding specific level of the reference voltage at every sensing period of each row line of the subpixels, after supplying the corresponding reference voltages to the reference lines of the subpixels; and converting the threshold voltage sensing voltage into threshold voltage sensing data.

17. The method according to 11, further comprising:

generating sensing data by sampling a voltage charged in a corresponding reference line of a subpixel at a plurality of different sampling times based on an increase from the corresponding specific level of the reference voltages for every sensing period of each row line of the subpixels, after supplying corresponding reference voltages to reference lines of the subpixels; and determining sensing data of an (N)th sampling time having a minimum deviation from sensing data of an (N-1)th sampling time as threshold voltage sensing data based on a comparison of the sensing data of the (N)th sampling time and the sensing data of the (N-1)th sampling time, where N is an integer greater than 2.

18. The method according to claim 17, further comprising:

stopping a sampling operation of a corresponding row line of subpixels after the (N)th sampling time when the sensing data of the (N)th sampling time is determined as the threshold voltage sensing data in a sensing period of the corresponding row line.

19. The method according to claim 11, wherein a corresponding specific level of the reference voltage set for a sensing period of each row line is same as or similar to a level obtained by subtracting a corresponding threshold voltage setting value for each row line stored in a memory during a previous sensing mode from a sensing data voltage supplied to data lines from a data driver.

20. The method according to claim 11, wherein a corresponding specific level of the reference voltage for each row line of the subpixels supplied to reference lines of the subpixels every sensing period of each of the row lines of the subpixels in a first threshold voltage sensing mode are different from a corresponding specific level of the reference voltage for each row line supplied to the reference lines every sensing period of each of the row lines in a second threshold voltage sensing mode.

21. A display device comprising:

a display panel including a plurality of subpixels arranged in rows, the plurality of subpixels respectively including a plurality of driving transistors;

a plurality of reference lines connected to the plurality of subpixels for supplying reference voltages for sensing threshold voltages of the plurality of driving transistors; and a data driver configured to:

supply a first reference voltage to the plurality of reference lines as an initialization voltage during a sensing period of a first row of subpixels among the plurality of subpixels at a threshold voltage sensing mode, and supply a second reference voltage to the plurality of reference lines as the initialization voltage during a sensing period of a second row of subpixels among the plurality of subpixels at the threshold voltage sensing mode, wherein a voltage level of the first reference voltage is different than a voltage level of the second reference voltage.

22. The display device according to claim 21, further comprising a power management circuit configured to supply driving voltages to the display panel, wherein the data driver is further configured to receive the first reference voltage and the second reference voltage from the power management circuit.

23. The display device according to claim 21, wherein the data driver is further configured to:

repeatedly sample a charged voltage in one or more reference lines among the plurality of reference lines corresponding to the first row of subpixels to generate a plurality of samples until a difference between one of the plurality of samples and a stored threshold voltage sensing data is less than or equal to a predetermined minimum deviation, and in response to the difference between the one of the plurality of samples and the stored threshold voltage sensing data being less than or equal to the predetermined minimum deviation, stop sampling the charged voltage and update the stored threshold voltage sensing data to be set to the one of the plurality of samples.

24. The display device according to claim 21, wherein the data driver is further configured to:

sense a first maximum threshold voltage of the first row of subpixels based on the first reference voltage during a first time period to generate first threshold voltage sensing data, transmit the first threshold voltage sensing data to a timing controller, sense a second maximum threshold voltage of the second row of subpixels based on the second reference voltage during a second time period after the first time period to generate second threshold voltage sensing data, and transmit the second threshold voltage sensing data to the timing controller.

25. The display device according to claim 24, wherein the timing controller is configured to:

receive the first threshold voltage sensing data and the second threshold voltage sensing data from the data driver, generate at least one updated reference voltage value based on comparing at least one of the first threshold voltage sensing data and the second threshold voltage with stored threshold voltage sensing data, and transmit the at least one updated reference voltage value to a power management circuit configured to supply driving voltages to the display panel.

26. The display device according to claim 25, wherein the power management circuit is further configured to:

receive the at least one updated reference voltage value, generate a third reference voltage based on the at least one updated reference voltage value, and supply the third reference voltage to the data driver, and wherein the data driver is further configured to:

in response to receiving the third reference voltage from the power management circuit, supply the third reference voltage to at least one of the first row of subpixels or the second row of subpixels for resampling a maximum threshold voltage of the at least one of the first row of subpixels or the second row of subpixels, and wherein the third reference voltage is different than the first reference voltage and the second reference voltage.

* * * * *